3,013,971
GEAR LUBRICANT IMPROVING AGENTS
Thomas W. Mastin, Willoughby, Ohio, assignor to The Lubrizol Corporation, Wickliffe, Ohio, a corporation of Ohio
No Drawing. Filed Feb. 5, 1959, Ser. No. 791,286
4 Claims. (Cl. 252—32.7)

The present invention relates, as indicated, to compositions intended for use in preparing lubricants for relatively moving metal surfaces. More particularly, it relates to compositions intended for the compounding of lubricants for the gears of automotive vehicles.

This application is a continuation-in-part of applicant's co-pending application Ser. No. 484,555, filed January 27, 1955 and now abandoned.

The problems of lubricating automotive gears became increasingly acute during the latter part of the decade 1920–1930, when manufacturers began to replace spiral bevel gears with hypoid gears in the rear axles of automotive equipment.

For reasons inherent in their design, hypoid gears permit the lowering of the center of gravity and the overall height of vehicles. Coupled with these desirable features, however, were many new lubrication problems. It was found that hypoid gears, unlike spiral bevel gears, could not be lubricated satisfactorily with ordinary mineral oils. The great pressures existing between the contacting metal surfaces in hypoid gear systems literally squeezed out the mineral oil lubricant, resulting in metal-to-metal contact under extremely high pressures and subsequent deformation and destruction of the gear surfaces.

Early workers in the lubricant art discovered that destructive metal-to-metal contact in hypoid gear systems could be avoided by the addition of certain oil-soluble chemical compositions to the mineral oil lubricant. These compositions, which were predominantly organic in nature but contained one or more inorganic elements such as sulfur, chlorine, and heavy metal in chemical combination, were believed to react with the gear surfaces under the elevated temperatures which generally accompany high pressures to form thin films or layers of iron sulfide, iron chloride, etc. on the gear surfaces. Such films acted as separatants and lubricants for the gear surfaces, thereby preventing destructive metal-to-metal contact.

In 1945 two full-scale gear lubricant performance tests were promulgated by the Ordnance Department of the U.S. Army; viz, specification AXS–1569, "Test Procedure for Determining the Load-Carrying Characteristics of Universal Gear Lubricants Under Conditions of High Speed," and specification AXS–1570, "Procedure for Determining the Load-Carrying, Wear, Stability, and Corrosion Characteristics of Universal Gear Lubricants Under Conditions of High Torque and Low Speed." Although these two tests were originally intended to aid the government and, more particularly, the armed service branches, in purchasing gear lubricants, they were eventually adopted by the petroleum industry at large as criteria for the selection and purchase of gear lubricants destined for the civilian market. For a number of years these tests satisfied the need for tests of good reproducibility which would simulate in the laboratory, insofar as possible, service conditions encountered in actual use of all types of automotive equipment.

However, within recent years, the sharp upward trend of engine horsepower has placed increasingly severe demands upon the hypoid gears which ultimately transmit the engine power to the drive wheels. These demands are not met with a satisfactory margin of safety by currently available gear lubricants which will pass one or both of the Ordnance Department tests referred to above.

From an engineering standpoint, the new service requirement encountered is principally one of greatly increased pressures or loads, particularly those of a sudden or "shock" nature, upon the gear teeth. Since the metallurgy and physical size of the gears has not been altered significantly to accommodate the greater engine torque, the lubricant alone must bear the heightened severity of operating conditions if it is to prevent gear failures. This need for a more satisfactory lubricant is particularly critical during the initial "break-in" period of a vehicle, for it is then that the gears are most susceptible to deformation.

As more or less a stop-gap measure, manufacturers of automotive equipment have factory-installed lubricants which will protect the gears against severe shock loading, even though such lubricants have been shown to be of little or no value in protecting the gears under high torque-low speed service conditions.

The problem of providing a gear lubricant which will lubricate hypoid gears in a changing operating environment wherein shock load, high speed, and high torque demands are made both cyclically and in sequence on the lubricant is a very difficult one. The difficulty stems principally from the fact, well known to workers in the lubricant art, that materials which help the lubricant perform its task under one set of operating conditions, say shock loading at high speeds, generally reduce or, in some instances, even nullify the effect of materials added to improve the performance of the lubricant under a different set of operating conditions; e.g., high torque loading at relatively lower speeds.

By effecting a critical balance between the proportions of materials known to be effective under (a) high speed operating conditions, and (b) high torque relatively lower speed operating conditions, prior workers in the lubricant art have been able to produce lubricants which meet the requirements of the aforesaid Army Ordnance high speed and high torque performance tests.

All of such carefully balanced or "compromise" lubricants have not proved amenable to modification, however, so as to enable them to withstand both severe shock loads at high speeds and high torque loads at relatively lower speeds. The addition thereto of materials known to be effective under shock load conditions upsets the carefully balanced lubricant and renders it substantially less effective in a high torque-low speed operating environment.

It is the principal object of the present invention therefore to provide novel improving agents for the production of lubricants which will render satisfactory performance in the hypoid gear systems of modern, highpowered, automotive equipment under severe operating conditions characterized by shock load, high speed, and high torque demands.

This and related objects of the invention will become apparent as the description of the invention proceeds.

In accordance with the present invention, it has been discovered that this and other objects may be achieved by the use of lubricant improving agents which contain certain critical proportions of both (a) an oil-soluble substituted phosphorodithioic acid containing an organic substituent, and (b) an oil-soluble organic polysulfide.

In a more particular sense, the invention relates to the provision of a liquid, homogeneous improving agent which, when present in gear lubricant compositions, increases the ability thereof to function under high speed-shock load as well as high torque conditions of operation, consisting of the combination of:

A. an oil-soluble derivative of a phosphorodithioic acid di-ester selected from the class consisting of the tri-esters, metal salts, and bis-phosphorodithioates thereof; and B. an oil-soluble organic polysulfide having at least one sulfur atom bonded only by secondary valence bonds;

said components A and B being present in relative proportions such that when an admixture thereof is dissolved in a solvent therefor in an amount equal to from about 3.5% to about 15% based on the weight of the total solution, said solution will have contributed thereto by said components:

(i) from about 0.20% to about 0.75% phosphorus; and
(ii) from about 0.25% to about 1.0% of chemically combined sulfur which is bonded only by secondary valence bonds.

In a yet more particular sense, the invention relates to the provision of a liquid, homogeneous improving agent which, when present in gear lubricating compositions, increases the ability thereof to function under high speed-shock load as well as high torque conditions of operation, consisting of the combination of:

A. an oil-soluble derivative of a phosphorodithioic acid di-ester selected from the class consisting of the triesters, metal salts, and bis-phosphorodithioates thereof; and
B. an oil-soluble organic polysulfide having at least one sulfur atom bonded only by secondary valence bonds;

said components A and B being present in relative proportions such that when an admixture thereof is dissolved in a solvent therefor in an amount equal to from about 3.5% to about 15% based on the weight of the total solution, said solution will have contributed thereto by said components:

(i) from about 0.3% to about 0.5% phosphorus; and
(ii) from about 0.5% to about 0.9% of chemically combined sulfur which is bonded only by secondary valence bonds.

The relative proportion of phosphorus to sulfur which is bonded only by secondary valence bonds will preferably be within the range of from about 1:1 to about 1:2.

In addition to the two characterizing components A and B, the lubricant improving agent and lubricants compounded therefrom may also contain, if desired, auxiliary improving agents such as, for example, rust inhibitors, oiliness agents, viscosity index improvers, and the like. The presence of these and other auxiliary agents, however desirable they may be for their contribution to the qualities of the finished lubricant, is not required to prevent gear deformation under severe operating conditions.

COMPONENT A: THE OIL-SOLUBLE SUBSTITUTED PHOSPHORODITHIOIC ACID CONTAINING AN ORGANIC SUBSTITUENT

Materials useful as this component are derivatives of phosphorodithioic acid di-esters and may be defined by the following formula:

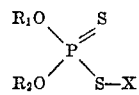

where $R_1$ and $R_2$ are the same or different ester radicals and X is the hydrogen equivalent of a radical capable of chemically replacing the acidic hydrogen atom of the phosphorodithioic acid di-ester and is selected from the class consisting of organic radicals and metallic radicals.

In the formula given above for component A, $R_1$ and $R_2$ are the same or different aromatic, aliphatic, or cycloaliphatic radicals, which radicals may be hydrocarbon in nature or contain substituents such as; e.g., chloro, bromo, fluoro, nitro, alkoxy, thioalkoxy, carboalkoxy, etc., $R_1$ and $R_2$ are usually hydrocarbon radicals such as; e.g., aryl, alkaryl, aralkyl, cycloalkyl, and straight- or branched-chain alkyl radicals. They are preferably alkyl radicals containing from 1 to about 40 carbon atoms such as; e.g., methyl, ethyl, n-propyl, isopropyl, n-butyl, sec-butyl, n-amyl, isoamyl, n-hexyl, 4-methyl-2-pentyl, n-octyl, capryl, n-nonyl, 3,5,5-trimethyl-hexyl, dodecyl, hexadecyl, eicosyl, tricosyl, and alkyl radicals of from about 20 to 40 carbon atoms derived from petroleum waxes.

As indicated earlier, $R_1$ and $R_2$ may be different ester radicals. A particularly valuable class of phosphorodithioic acid di-esters useful as starting materials for the preparation of component A are those in which (1) $R_1$ and $R_2$ are different alkyl radicals, one containing at least 6 carbon atoms and the other containing less than 6 carbon atoms; or (2) at least two different phosphorodithioic acid di-esters are present, $R_1$ and $R_2$ of one acid being alkyl radicals of at least 6 carbon atoms each and $R_1$ and $R_2$ of a second acid being alkyl radicals of less than 6 carbon atoms each. These useful phosphorodithioic acid di-esters and their metal salts are disclosed in pending application, Serial No. 251,139, filed October 11, 1951, now U.S. Patent No. 2,838,555 by Fred C. Goldsmith and having an assignee common to the instant application.

X, as indicated above, is a radical capable of chemically replacing the acid hydrogen atom of the phosphorodithioic acid di-ester and selected from the class consisting of organic radicals and metallic radicals. By the latter statement it is not meant to infer that all organic radicals and/or metallic radicals are fully equivalent for the purposes of this invention, since some are preferred over others for certain uses.

Where X is an organic radical, it is preferably an organic radical containing at least one inorganic element or substituent. More particularly, it is an aromatic or aliphatic radical and preferably an aliphatic radical containing at least one inorganic element such as; e.g., oxygen, sulfur, phosphorus, halogen, nitrogen, and metal. Among the inorganic substituted aliphatic radicals most suitable as X are (1) hydroxyl substituted aliphatic radicals, and (2) aliphatic radicals containing at least two different inorganic elements such as; e.g., phosphorus-and-sulfur-substituted aliphatic radicals and metal-and-oxygen-substituted aliphatic radicals.

In this group of inorganic substituted aliphatic radicals most suitable as X, a preference exists for monohydroxyalkyl radicals and the anionic radicals of phosphorodithioic acid di-esters.

Thus X may be, for example, one of the following radicals: 2-chloroethyl, 2-hydroxyethyl, 2- and 3-hydroxypropyl, 2-mercaptoethyl, 2- and 3-mercaptopropyl, 4-nitrobutyl, 3-hydroxybutyl, 2-cyanopropyl, trichloromethyl, 4-chlorobenzyl, trichlorobenzyl, 2-methyl-4-oxo-2-pentyl, heptyl, capryl, 4-oxo-cyclohexyl, 2-thio-butyl, the anionic radical of di-(4-methyl-2-pentyl) phosphorodithioic acid, the anionic radical of di-(methyl-cyclohexyl) phosphorodi-thioic acid, carbomethoxymethyl, carbomethoxyethyl, hydroxyethoxyethyl, epoxypropyl, 2,4-dihydroxybutyl, carboxymethyl, zinc carboxymethyl, lead-carboxyethyl, etc.

When X is a metallic radical it is usually a polyvalent metal and preferably a heavy metal of atomic weight greater than 50 such as; e.g., zinc, cadmium, barium, strontium, lead, tin, etc., with a particular preference for zinc. It is to be understood that in the case of polyvalent metallic radicals, which radicals contain two or more equivalents of metal, the additional valence bonds of the metal will extend similarly to anions of the phosphorodithioic acid di-ester. Thus, for example, a zinc salt of a phosphorodithioic acid di-ester can be represented by either of the structures below:

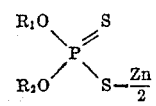

or

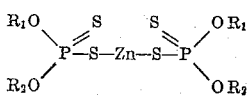

wherein

and Zn represent, respectively, one hydrogen equivalent and two hydrogen equivalents of zinc.

Specific examples of materials useful as component A are as follows, which examples are presented for purposes of illustration only and are not to be construed as limiting the scope of the invention:

Phosphorodithioic acid tri-esters such as, e.g.:

Di-ethyl 2-chloroethyl phosphorodithioate
Di-isopropyl 2-hydroxypropyl phosphorodithioate
Di-isopropyl 3-hydroxypropyl phosphorodithioate
Di-sec-butyl 2-mercaptopropyl phosphorodithioate
Di-n-pentyl 4-nitrobutyl phosphorodithioate
Di-(4-methyl-2-pentyl) 2-hydroxypropyl phosphorodithioate
Di-(4-methyl-2-pentyl) 3-hydroxypropyl phosphorodithioate
Di-isopropyl heptyl phosphorodithioate
Di-n-hexyl capryl phosphorodithioate
Di-nonyl hydroxyethoxyethyl phosphorodithioate
Di-lauryl 3-hydroxybutyl phosphorodithioate
Di-(2-ethyl-hexyl) 2-hydroxypropyl phosphorodithioate
Di-(2-ethyl-hexyl) carbomethoxymethyl phosphorodithioate
Di-(2-ethyl-hexyl) carbomethoxyethyl phosphorodithioate
Di-(4-methyl-2-pentyl) carbomethoxyethyl phosphorodithioate
Di-(4-methyl-2-pentyl) 2-cyanoethyl phosphorodithioate
Di-(4-methyl-2-pentyl) 2-methyl-4-oxo - 2 - pentyl phosphorodithioate
Di-(4-tert-butyl-phenyl) 2 - hydroxy-ethyl phosphorodithioate
Di-(4-tert-amyl-phenyl) 3 - hydroxy-pentyl phosphorodithioate
Di-benzyl 2-mercaptoethyl phosphorodithioate
Di-(2-phenethyl) trichloromethyl phosphorodithioate
Di-(2-ethyl-hexyl) zinc-carboxymethyl phosphorodithioate
Di-(2-ethyl-hexyl) lead-carboxyethyl phosphorodithioate Bis-phosphorodithioates such as, e.g., bis-(di-alkyl phosphorodithioates):

Bis-[di-4-methyl-2-pentyl) phosphorodithioate]
Bis-[di-(methyl-cyclohexyl) phosphorodithioate]

Phosphorodithioic acid di-ester thioanhydrides such as, e.g.:

Thioanhydride of di-n-butyl phosphorodithioic acid

Metal salts of phosphorodithioic acid di-esters such as, e.g.:

Zinc di-(4-methyl-2-pentyl) phosphorodithioate
Zinc di-organo phosphorodithioate made by neutralizing a mixture of 40 mole-percent of di-isopropyl phosphorodithioic acid and 60 mole-percent of di-(4-methyl-2-pentyl) phosphorodithioic acid with zinc oxide
Zinc isopropyl 4-methyl-2-pentyl phosphorodithioate
Zinc di-(3,5,5-trimethyl-hexyl) phosphorodithioate
Zinc n-butyl 4-methyl-2-pentyl phosphorodithioate
Zinc di-lauryl phosphorodithioate
Zinc di-(tert-octyl-phenyl) phosphorodithioate
Lead di-capryl phosphorodithioate
Stannous di-cetyl phosphorodithioate
Cadmium di-eicosyl phosphorodithioate
Barium di-lauryl phosphorodithioate From the foregoing it will be noted that materials of particular utility as component A are derivatives of phosphorodithioic acid di-esters selected from the class consisting of the tri-esters, metal salts, and bis-phosphorodithioates thereof. Of this group, a preference exists for the zinc salts of phosphorodithioic acid di-esters, with a special preference for zinc salts of di-alkyl esters of phosphorodithioic acid. An eminently suitable group of such zinc salts of di-alkyl esters of phosphorodithioic acid are those in the molecular structure of which there is present a substantial proportion of each of (a) alkyl radicals containing at least 6 carbon atoms, and (b) alkyl radicals containing less than 6 carbon atoms, as disclosed in pending application, Serial No. 251,139, referred to supra.

The preparation of compounds useful as component A is well-known in the art. In most instances, the starting material will be a phosphorodithioic acid di-ester produced by the reaction of an organic hydroxy body with phosphorus pentasulfide according to the equation:

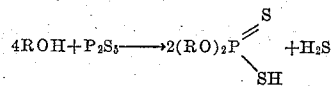

From such phosphorodithioic acid di-ester may then be derived by known processes the component A of the present invention. In the interest of not unduly lengthening the present specification, reference may be made to the following U.S. patents which disclose methods for the preparation of materials useful as component A: 1,889,943; 1,949,629; 2,063,629; 2,198,915; 2,261,047; 2,266,514; 2,329,436; 2,342,572; 2,343,213; 2,343,831; 2,344,392; 2,344,393; 2,344,395; 2,347,592; 2,365,938; 2,368,000; 2,372,358; 2,494,126; 2,494,283; 2,494,284; 2,528,732; 2,529,304; 2,540,084; 2,561,773; 2,565,920; 2,578,652; 2,586,655; 2,586,656; 2,611,728; 2,611,729; 2,632,020; 2,645,657; and 2,659,705.

COMPONENT B: THE OIL-SOLUBLE ORGANIC POLY-SULFIDE HAVING AT LEAST ONE SULFUR ATOM BONDED ONLY BY SECONDARY VALENCE BONDS

Materials useful as this component may be defined broadly by the formula:

wherein R and R' represent the same or different mono- or polyvalent organic radicals bonded to S, $x$ and $y$ are small whole numbers, S is sulfur, and $z$ is at least 2; said polysulfide further characterized in that at least one of the sulfur atoms therein is bonded only by secondary valence bonds.

R and R' may be aromatic, aliphatic, or cycloaliphatic and may be hydrocarbon in nature or contain substituents such as; e.g., chloro, fluoro, bromo, alkoxy, carboalkoxy, nitro, nitroso, hydroxyl, etc. In most instances they are hydrocarbon radicals such as; e.g., alkyl, aralkyl, alkaryl, cycloalkyl, cycloalkenyl, alkenyl, or aryl radicals; however for some uses the presence of organic or inorganic substituents is desirable. Typical illustrations of R and R' would include; e.g., benzyl, chlorobenzyl, dichlorobenzyl, phenethyl, phenyl-propyl, propyl, butyl, tert-octyl, ethoxy-ethyl, carbolauroxyethyl, ethylene, trimethylene, butyl-phenyl, amyl-phenyl, octyl-phenyl, nitrophenyl, cyclohexyl, methyl-cyclohexyl, isobutenyl, tert-octenyl, methoxy-phenyl, ethoxy-naphthyl, amyl-hydroxyphenyl, butyl-chlorophenyl, etc. Particularly preferred are those polysulfides wherein R and R' are like aralkyl or substituted aralkyl radicals, with a special preference for benzyl and chlorobenzyl.

The subscripts $x$ and $y$ are generally each 1, but in the case of certain complex polysulfides such as; e.g.,

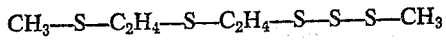

they may be 2 or more. The subscript $z$ is at least 2 and generally not more than 7. In certain instances, as in the case of mixed organic polysulfides, it may be a non-integral member such as; e.g., 3.3 or 4.6.

By the phrase "sulfur atom bonded only by secondary valence bonds" I mean a sulfur atom which is bonded only to one or more sulfur atoms in the polysulfide molecule and is thus devoid of valence bonds extending to the organic radicals in the polysulfide molecule. The exact nature of such secondary valence bonds is not clearly understood, but it is known that they are much weaker than the covalent bond which exists between a sulfur atom and a carbon atom of an organic radical in an organic polysulfide.

Due to the relatively weak attachment of sulfur atoms which are bonded only by secondary valence bonds, such sulfur is more readily given up by the molecule; i.e., is more reactive chemically, than sulfur which is bonded to a carbon atom of an organic radical. The very fact that such sulfur is chemically reactive facilitates its determination. For example, a test sample of the organic polysulfide may be treated with reagents which are known to react with and thus to remove reactive sulfur such as; e.g., warm aqueous caustic solutions, warm aqueous solutions of metallic monosulfides, finely divided metals such as copper, lead, iron, silver, etc. The loss in sulfur content of the test sample of organic polysulfide after such treatment corresponds to the amount of reactive sulfur originally present; i.e., that sulfur which is bonded only by secondary valence bonds.

Thus it is possible to characterize an organic polysulfide both by its content of ($a$) "total sulfur"; i.e., sulfur in all forms, and ($b$) sulfur bonded only by secondary valence bonds. The discovery that certain critical amounts of the kind of sulfur indicated in ($b$) must be present in my lubricants constitutes one of the principal features of my invention.

The following partial structures illustrate some of the many arrangements which sulfur atoms can assume in organic polysulfides. In each of these partial structures the presence of an asterisk next to a sulfur atom indicates that such sulfur atom is held in the molecule by secondary valence bonds only:

Disulfides:

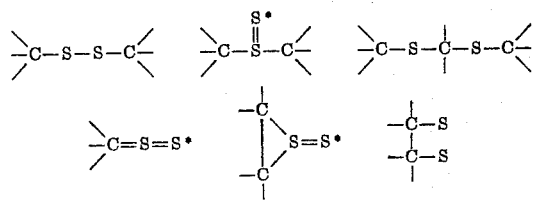

Trisulfides:

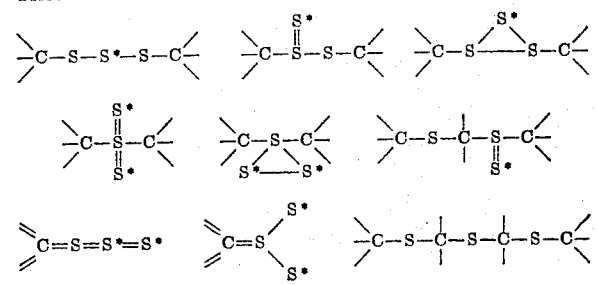

Higher polysulfides:

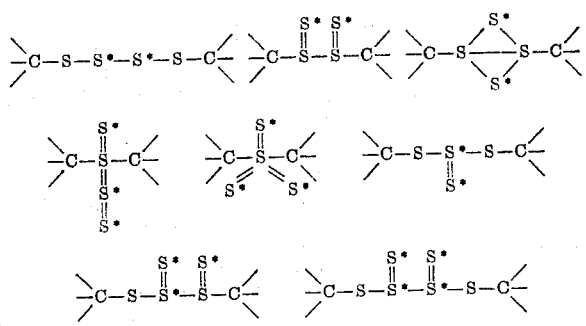

From a study of the structures given above, it will be apparent that organic polysulfides of like molecular weight and containing the same percentages of chemical elements may possess widely different amounts of reactive sulfur depending on the mode of attachment of the sulfur atoms within the molecule. Those structures which possess the largest number of sulfur atoms bonded only by secondary valence bonds will possess the highest percentage of reactive sulfur.

Specific examples of organic polysulfides which contain at least one sulfur atom bonded only by secondary valence bonds and which are useful as Component B in lubricants of this invention are, for example:

Di-benzyl trisulfide
Di-benzyl tetrasulfide
Di-benzyl polysulfides containing an average of 4.6 sulfur atoms per molecule
Di-benzyl pentasulfide
Di-benzyl hexasulfide
Monochloro di-benzyl tetrasulfide
Di-(4-chlorobenzyl) tetrasulfide
Bis-(2,4-dichlorobenzyl) tetrasulfide
Di-phenethyl tetrasulfide
Di-phenyl trisulfide
Di-(isopropyl-phenyl) tetrasulfide
Di-(tert-octyl-phenyl) tetrasulfide
Di-(alpha-naphthyl) trisulfide
Di-(amyl-hydroxyphenyl) tetrasulfide
Di-(butyl-chlorophenyl) trisulfide
Di-tert-butyl tetrasulfide
Di-n-hexyl pentasulfide
Di-tert-octenyl tetrasulfide
Di-tert-octyl trisulfide
Di-(methyl-cyclohexyl) pentasulfide
Di-(cyclohexyl) tetrasulfide
Turpentine polysulfides containing an average of 2.6 sulfur atoms per molecule
Amyl-phenyl cyclohexyl trisulfide
Lauryl ethyl tetrasulfide
Pine oil polysulfides containing an average of from 2 to 3 sulfur atoms per molecule
Di-wax polysulfides containing an average of from 2 to 4 sulfur atoms per molecule The preparation of materials useful as component B may be accomplished by any of the many different processes which are known and disclosed in the art including, for example, the reaction of halogen-bearing organic compounds with alkali metal polysulfides, the reaction of mercaptans with sulfur and/or sulfur halides, the reaction of saturated and unsaturated hydrocarbons with sulfur and/or sulfur halides, the reaction of organic monosulfides with sulfur, etc.

*Auxiliary improving agents*

As previously indicated, there may also be present in our lubricants certain auxiliary improving agents such as, for example, detergents, rust-preventatives, film strength agents such as halogenated organic compounds, oiliness agents such as fatty oils and sulfurized fatty oils, pour point depressors, foam inhibitors, viscosity index improvers, oxidation inhibitors, odor improvers and the like. Included among the many materials useful for these various purposes are the following:

Detergents such as metal salts of petroleum naphthenic acids, petroleum sulfonic acids, the higher fatty acids, etc.; rust-preventatives such as basic metal petroleum sulfonates, metal phenolates, organic amines, benzyl thiocyanate, etc.; film strength agents such as chlorinated paraffin waxes containing from 20 to 70% chlorine, chlorinated eicosane containing from 50 to 60% chlorine, hexachloro-diphenyl ether, polychlorobiphenyl, etc.; oiliness agents such as olein, methyl oleate, oleic acid, sulfurized and non-sulfurized sperm oil, corn oil, etc.; pour point depressors such as wax-alkylated naphthalene or phenanthrene, etc.; foam inhibitors such as the polymeric di-alkyl silicones, etc.; and viscosity index improvers such as polymerized and co-polymerized alkyl methacrylates, polymerized butylenes, etc.

It is to be understood, however, that the use of any of such auxiliary agents is optional and not required in our lubricants to prevent the deformation of gear surfaces.

*The oil base*

The lubricating oil base in which the characterizing components A and B of this invention and any desired auxiliary agents are incorporated may be of synthetic, vegetable, animal, or mineral origin. Because of their low cost, availability, and desirability, the mineral oils; i.e., those derived from petroleum, find the widest application in the lubricant art.

There are at the present time sundry mineral oils, each best suited from the standpoint of viscosity and other properties for different climates and operating environments. The oil base of a lubricating composition of the present invention will preferably comprise a mineral lubricating oil having characteristics now well recognized as best suited for such environment and climate.

In Table I following, the characteristics of mineral lubricating oils best suited for a given environment and climate are disclosed. The actual upper limit of preferred viscosity index is infinite for most uses. The values given in the table for viscosity index represent current commercial maximum values.

TABLE I

| Type of climate | Application in— | |
|---|---|---|
| | Automotive gears | Industrial gears |
| | *Degrees F.* | *Degrees F.* |
| Artic: | | |
|   Preferred viscosity range [1] | 30–80/210 | 30–1,000/210 |
|   Flash point preferably no lower than | 300 | 300 |
|   Pour point preferably no higher than | −30 | 10 |
| Temperate: | | |
|   Preferred viscosity range [1] | 50–140/210 | 50–2,000/210 |
|   Flash point preferably no lower than | 325 | 325 |
|   Pour point preferably no higher than | 0 | 20 |
| Tropical: | | |
|   Preferred viscosity range [1] | 80–200/210 | 80–2,000/210 |
|   Flash point preferably no lower than | 350 | 325 |
|   Pour point preferably no higher than | 20 | 30 |
| Preferred viscosity index for all climates (Dean and Davis scale) | 75–150 | 35–120 |

[1] Expressed in Saybolt Universal seconds at the indicated temperature.

*Lubricants and lubricant improving agents*

As indicated previously, a number of hypoid gear lubricants representative of the several fundamental types which are commercially available were first investigated to determine their effectiveness in preventing deformation of gear surfaces in an operating environment characterized by severe "shock" loads at high speeds and high torque loads at relatively lower speeds.

Full-scale performance tests; i.e., tests using standard automotive equipment, employed in this connection included the Army Ordance AXS-1569 high speed and AXS-1570 high torque tests and, in addition, a new severe shock test using a 1953 model Buick passenger car equipped with a torque converter transmission of the "Dynaflow" variety.

The latter test, termed for convenience the "Buick Shock Test," is one of almost unbelievable severity. It is carried out in the laboratory by mounting the rear drive wheels of the car on a heavy shaft which is free to revolve and which is designed to simulate the inertia of the car on a level highway. Although the test could conceivably be conducted on the open road, the severe operating conditions specified in its procedure would make such a course extremely hazardous.

In carrying out the test, the rear axle of the car is filled to the specified level with the desired test lubricant and the car is run for the equivalent of 19 miles at 40–50 m.p.h. to break in the new gears. The car is then accelerated from 0 to 70 m.p.h. and decelerated to 0 m.p.h. with the transmission in drive position. If no unusual noise is detected in the rear axle, the car is subjected to a high speed evaluation comprising 10 cycles of acceleration and deceleration, 0 to 70 to 0 m.p.h., with the transmission in drive position.

Next, for the shock portion of the test, the car brakes are applied, the throttle opened with the transmission in low position, and the brakes released suddenly. When the car reaches 30 m.p.h. the transmission is shifted to the drive position and acceleration is continued to 75 m.p.h. The throttle is then closed and the car is decelerated to 65 m.p.h., at which speed the transmission is shifted abruptly to the low position. From the preceding description, it is apparent to one familiar with automotive equipment that shock loads of extreme severity are placed upon the coast and drive surfaces of the hypoid gear teeth.

After the shock portion of the test is completed, the high speed evaluation described earlier and comprising 10 cycles of acceleration and deceleration is repeated.

The car is stopped and the pinion and ring gears are removed and inspected for evidence of deformation such as rippling, ridging, spalling, and scoring. These terms define certain specific kinds of deformation which are readily distinguished from each other by trained mechanics. If such inspection shows the gear teeth to be free from deformation, the lubricant is said to have passed the test.

Table II includes the results obtained on commercially available hypoid gear lubricants in the three full-scale tests which have been described. The lubricants are defined by chemical type in terms which are familiar to those in the lubricant art. It will be noted that none of the lubricants gave satisfactory performance in all of the tests, even though several satisfied the less rigorous requirements of the two well-known Army Ordance tests.

TABLE II

| Type of lubricant | Test result | | |
|---|---|---|---|
| | Buick shock | High speed AXS–1569 | High torque AXS–1570 |
| Lead soap-corrosive sulfur | Pass | Pass | Fail. |
| Chlorine-mild sulfur-phosphorus (regular duty) | Fail | ---do--- | Pass. |
| Chlorine-mild sulfur-phosphorus (heavy duty) | ---do--- | ---do--- | Do. |
| Chlorine-mild sulfur | ---do--- | ---do--- | Fail. |
| Fixed oil-mild sulfur | ---do--- | ---do--- | Do. |

These results point up the critical situation which preceded the present discovery; viz., that no hypoid gear lubricant was available which would withstand both the rigors of shock loads at high speeds and high torque loads at relatively lower speeds.

As stated hereinbefore, lubricants capable of giving satisfactory performance under these extremes of operating conditions can be made by incorporating therein certain critical proportions of two characterizing components; viz, (A) an oil-soluble substituted phosphorodithioic acid containing an organic substituent, and (B) an oil-soluble organic polysulfide having at least one sulfur atom bonded only by secondary valence bonds.

Table III includes test data on many lubricants containing the characterizing component A and B of the present invention in amounts which either come within or fall outside of the ranges found to be critical for each.

The tests employed were the Buick Shock test, the Army Ordnance AXS–1570 high torque test, and the SAE Extreme-Pressure Lubricant test at 1000 r.p.m. Army Ordnance test AXS–1569 was not employed in these studies since it had been determined that any lubricant which passed the Buick Shock test, which test includes a high speed evaluation, would always pass the less severe AXS–1569 test.

The SAE Extreme-Pressure Lubricant test included in Table III is a test which is well-known in the lubricant art. It is carried out on the SAE Lubricant machine in the manner set forth on page 45 of A.S.T.M. Bulletin No. 181, April 1952. It was found that lubricants which failed this test; i.e., would not sustain the full 590–600 pounds load, also failed the Buick Shock test. Since it was not feasible to conduct Buick Shock tests on all of the large number of lubricants investigated, the SAE test was employed to screen out lubricants which would not pass the former test.

It will be noted that in every instance when one or both of the two characterizing components A and B was present in an amount falling outside of the critical range disclosed herein, the lubricant failed to give satisfactory performance. On the other hand, when these same components were each present in a lubricant in amounts within the range found to be operative, the lubricant was effective in preventing gear deformation under both shock loads at high speeds and high torque loads at relatively lower speeds. For convenient identification, lubricants of the invention in Table III have been indicated by an asterisk (*).

Additional examples of lubricants of the invention are disclosed in Table IV. These are presented for purposes of illustration only and are not to be construed as limiting the scope of the invention, particularly with respect to the inclusion of optional auxiliary improving agents such; e.g., detergents, oiliness agents, foam inhibitors, etc.

The numerical values in parentheses; e.g. (0.37% P) and (0.5% sec. S), following the characterizing components A and B indicate, respectively, the percent phosphorus and percent sulfur bonded only by secondary valence bonds imparted to the finished lubricant by the particular component.

TABLE IV

| Lubricant No. | Percent by weight | Composition |
|---|---|---|
| 16 | 88.0 | SAE 90 gear lubricant. |
| | 6.0 | Zinc di-lauryl phosphorodithioate (0.37% P). |
| | 6.0 | Di-tert-butyl trisulfide (0.91% sec. S). |
| 17 | 93.7 | SAE 90 gear lubricant. |
| | 3.1 | Zinc di-(tert-amyl-phenyl) phosphorodithioate (0.21% P). |
| | 3.2 | Di-(cyclohexyl) tetrasulfide (0.7% sec. S). |
| 18 | 96.35 | SAE 80 gear lubricant. |
| | 2.4 | Zinc di-amyl phosphorodithioate (0.25% P). |
| | 1.25 | Di-n-amyl pentasulfide (0.4% sec. S). |
| 19 | 83.1995 | SAE 90 gear lubricant. |
| | 12.8 | Lead di-lauryl phosphorodithioate (0.7% P). |
| | 3.0 | Di-(4-chlorophenyl) trisulfide (0.3% sec. S). |
| | 1.0 | Barium petroleum sulfonate. |
| | 0.0005 | Dimethyl silicone polymer. |
| 20 | 89.17 | SAE 90 gear lubricant. |
| | 4.4 | Zinc di-(4-methyl-2-pentyl) phosphorodithioate (0.42% P). |
| | 2.73 | Di-benzyl polysulfides containing an average of 4.6 sulfur atoms per molecule (0.68% sec. S). |
| | 0.4 | Lead naphthenate. |
| | 3.3 | Chlorinated eicosane containing 50% chlorine. |
| 21 | 87.57 | SAE 90 gear lubricant. |
| | 4.4 | Zinc di-(4-methyl-2-pentyl) phosphorodithioate (0.42% P). |
| | 2.73 | Di-benzyl polysulfides containing an average of 4.6 sulfur atoms per molecule (0.68% sec. S). |
| | 2.0 | Sulfurized sperm oil. |
| | 3.3 | Chlorinated eicosane containing 50% chlorine. |
| 22 | 85.8 | SAE 80 gear lubricant. |
| | 8.0 | Tin di-octyl phosphorodithioate (0.6% P). |
| | 5.5 | Di-(2-naphthyl) trisulfide (0.5% sec. S). |
| | 0.5 | Octadecylamine caprylate. |
| | 0.2 | Zinc di-butyl dithiocarbamate. |
| 23 | 89.0 | SAE 90 gear lubricant. |
| | 9.0 | Di-(4-methyl-2-pentyl) carbomethoxymethyl phosphorodithioate (0.75% P). |
| | 0.7 | Di-tert-butyl hexasulfide (0.3% sec. S). |
| | 0.3 | Oleic acid. |
| | 1.0 | Lard oil. |
| 24 | 90.3 | SAE 90 gear lubricant. |
| | 5.5 | Di-(4-methyl-2-pentyl) 2-hydroxyethyl phosphorodithioate (0.5% P). |
| | 3.7 | Di-phenethyl tetrasulfide (0.7% sec. S). |
| | 0.5 | Basic calcium petroleum sulfonate. |

TABLE III

[All percentages of improving agents are by weight based on the total lubricant]

Component A materials employed:
A–1=zinc di-organophosphorodithioate made by neutralizing a mixture of 40 mole-percent of di-isopropyl phosphorodithioic acid and 60 mole-percent of di-(4-methyl-2-pentyl) phosphorodithioic acid with zinc oxide.
A–2=zinc di-(4-methyl-2-pentyl) phosphorodithioate.
A–3=di-(4-methyl-2-pentyl) hydroxypropyl phosphorodithioate.
A–4=Bis-[di-(4-methyl-2-pentyl) phosphorodithioate].

Component B materials employed:
B–1=monochlor dibenzyl tetrasulfide.
B–2=di-benzyl polysulfides containing an average of 4.6 sulfur atoms per molecule.
B–3=turpentine polysulfides containing an average of 2.6 sulfur atoms per molecule.

[SAE 90 grade gear lubricant containing the indicated kinds and amounts of improving agents]

| Lubricant No. | Component A | | | Component B | | | Test | | |
|---|---|---|---|---|---|---|---|---|---|
| | Kind | Percent | Percent P contributed to lube | Kind | Percent | Percent sec. S contributed to lube [1] | SAE test at 1,000 r.p.m. | Buick shock | AXS-1570 high-torque |
| 1 | None | | | B-1 | 5.22 | 0.97 | | Pass | Fail. |
| 2 | A-1 | 6.7 | 0.71 | None | | | Fail | Fail | |
| 3 | A-1 | 1.07 | 0.11 | B-1 | 3.75 | 0.70 | do | | |
| 4 | A-1 | 4.78 | 0.51 | B-1 | 0.84 | 0.16 | do | | |
| 5* | A-1 | 3.5 | 0.37 | B-1 | 2.84 | 0.53 | | Pass | Pass. |
| 6 | A-2 | 4.4 | 0.42 | None | | | Fail | Fail | |
| 7 | A-2 | 0.87 | 0.082 | B-2 | 2.85 | 0.71 | do | | |
| 8 | A-2 | 1.57 | 0.15 | B-2 | 4.28 | 1.07 | Pass | Pass | Fail. |
| 9 | A-2 | 3.47 | 0.33 | B-2 | 0.71 | 0.18 | Fail | | |
| 10* | A-2 | 3.78 | 0.36 | B-2 | 2.34 | 0.59 | | Pass | Pass. |
| 11* | A-2 | 4.4 | 0.42 | B-2 | 2.05 | 0.51 | | do | Do. |
| 12* | A-2 | 5.37 | 0.51 | B-2 | 3.33 | 0.83 | | do | Do. |
| 13* | A-2 | 4.4 | 0.42 | B-3 | 3.64 | 0.85 | | do | Do. |
| 14* | A-3 | 5.25 | 0.42 | B-2 | 2.73 | 0.68 | | do | Do. |
| 15* | A-4 | 3.94 | 0.37 | B-2 | 2.73 | 0.68 | | do | Do. |

[1] "Percent sec. S"=percent sulfur bonded only by secondary valence bonds.

It is common practice in the lubricant additive industry to provide a liquid, homogeneous improving agent concentrate containing high percentages of one or more separate improving agents and, optionally, a proportion of a mineral oil, preferably one of low viscosity. Such concentrates dissolve readily in lubricating oil bases and minimize the problems associated with handling, storage, and transportation. A further benefit in cases where two or more separate improving agents are to be incorporated in the oil base is that the relative proportions of the several improving agents can be adjusted within the concentrate by the manufacturer. Then in preparing the finished lubricant, a single addition of only one concentrate need be made to the oil base to impart thereto the desired improving agents in predetermined relative proportions.

Concentrates intended for compounding with an oil base to yield lubricants of the present invention will always contain the two previously identified characterizing components A and B and optionally:

(1) certain desired auxiliary improving agents: and
(2) a proportion, generally from about 10% to about 70% by weight based on the total concentrate, of a low-viscosity mineral oil.

As previously indicated, components A and B will be present in such relative proportions in the concentrate that when the concentrate is incorporated in the lubricant, such lubricant will have contributed thereto by said components:

(1) from about 0.20% to about 0.75% and preferably from about 0.3% to about 0.5% phosphorous; and
(2) from about 0.25% to about 1.0% and preferably from about 0.5% to about 0.9% of chemically combined sulfur which is bonded only by secondary valence bonds.

Depending on the particular components A and B employed, the presence of auxiliary improving agents, and, in some instances, the presence of mineral oil in the concentrate, the amount thereof required to impart to the lubricant the necessary percent phosphorus and percent sulfur bonded only by secondary valence bonds will vary considerably. Generally an amount of the concentrate equal to from about 3.5% to about 15% based on the weight of the total lubricant will be suitable.

Other modes of applying the principle of the invention may be employed, change being made regarding the details described, provided that the features stated in any of the following claims or the equivalent thereof be employed.

I therefore particularly point out and distinctly claim as my invention:

1. A liquid, homogeneous improving agent which, when present in gear lubricant compositions, increases the ability thereof to function under high speed-shock load as well as high torque conditions of operation, consisting of the combination of:

A. an oil-soluble zinc salt of a dialkyl phosphorodithioic acid di-ester having from 1 to about 40 carbon atoms in each alkyl group, and
B. an oil-soluble, substantially hydrocarbon organic polysulfide having from 2 to 7 sulfur atoms and having at least one sulfur atom bonded only by secondary valence bonds said organic polysulfide being selected from the group consisting of turpentine polysulfides and pine oil polysulfides;

said components A and B being present in relative proportions such that when an admixture thereof is dissolved in a solvent therefor in an amount equal to from about 3.5% to about 15% based on the weight of the total solution, said solution will have contributed thereto by said components:

(i) from about 0.20% to about 0.75% phosphorus; and
(ii) from about 0.25% to about 1.0% of chemically combined sulfur which is bonded only by secondary valence bonds.

2. The improving agents of claim 1 further characterized in that the relative proportion of phosphorus to sulfur which is bonded only by secondary valence bonds is within the range of from about 1:1 to about 1:2.

3. The improving agent of claim 1 further characterized in that component B is a turpentine polysulfide.

4. The improving agent of claim 1 further characterized in that component A is a zinc salt of a di-alkyl ester of phosphorodithioic acid in the molecular structure of which there is present a substantial proportion of each of (a) alkyl radicals containing at least 6 carbon atoms, and (b) alkyl radicals containing less than 6 carbon atoms.

References Cited in the file of this patent

UNITED STATES PATENTS

| | | |
|---|---|---|
| 2,157,452 | Humphreys | May 9, 1939 |
| 2,186,271 | Pevere | Jan. 9, 1940 |
| 2,192,874 | Smith et al. | Mar. 5, 1940 |
| 2,205,858 | Mikeska et al. | June 25, 1940 |
| 2,343,831 | Osborne | Mar. 7, 1944 |
| 2,364,284 | Freuler | Dec. 5, 1944 |
| 2,382,115 | Stucker | Aug. 14, 1945 |
| 2,514,625 | Clausen et al. | July 11, 1950 |
| 2,689,220 | Mulvany | Sept. 14, 1954 |
| 2,723,236 | Asseff et al. | Nov. 8, 1955 |
| 2,838,555 | Goldsmith | June 10, 1958 |

FOREIGN PATENTS

| | | |
|---|---|---|
| 679,465 | Great Britain | Sept. 17, 1952 |
| 679,466 | Great Britain | Sept. 17, 1952 |
| 689,759 | Great Britain | Apr. 1, 1953 |